June 3, 1941. J. R. COLE 2,244,100
ACTUATING LEVER MECHANISM FOR RECIPROCATING VALVE STEMS
Filed April 3, 1939 2 Sheets-Sheet 1
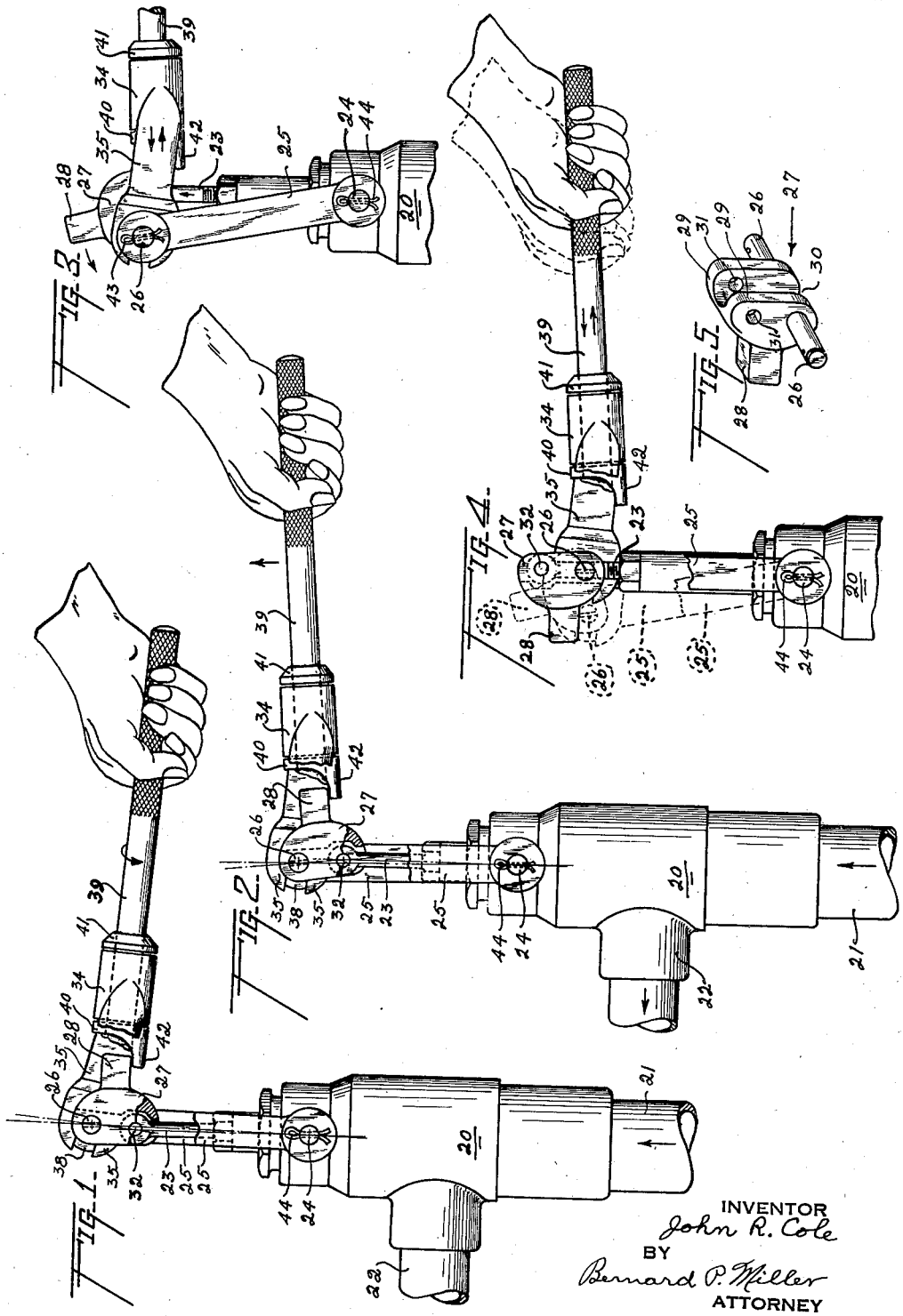
INVENTOR
John R. Cole
BY
Bernard P. Miller
ATTORNEY

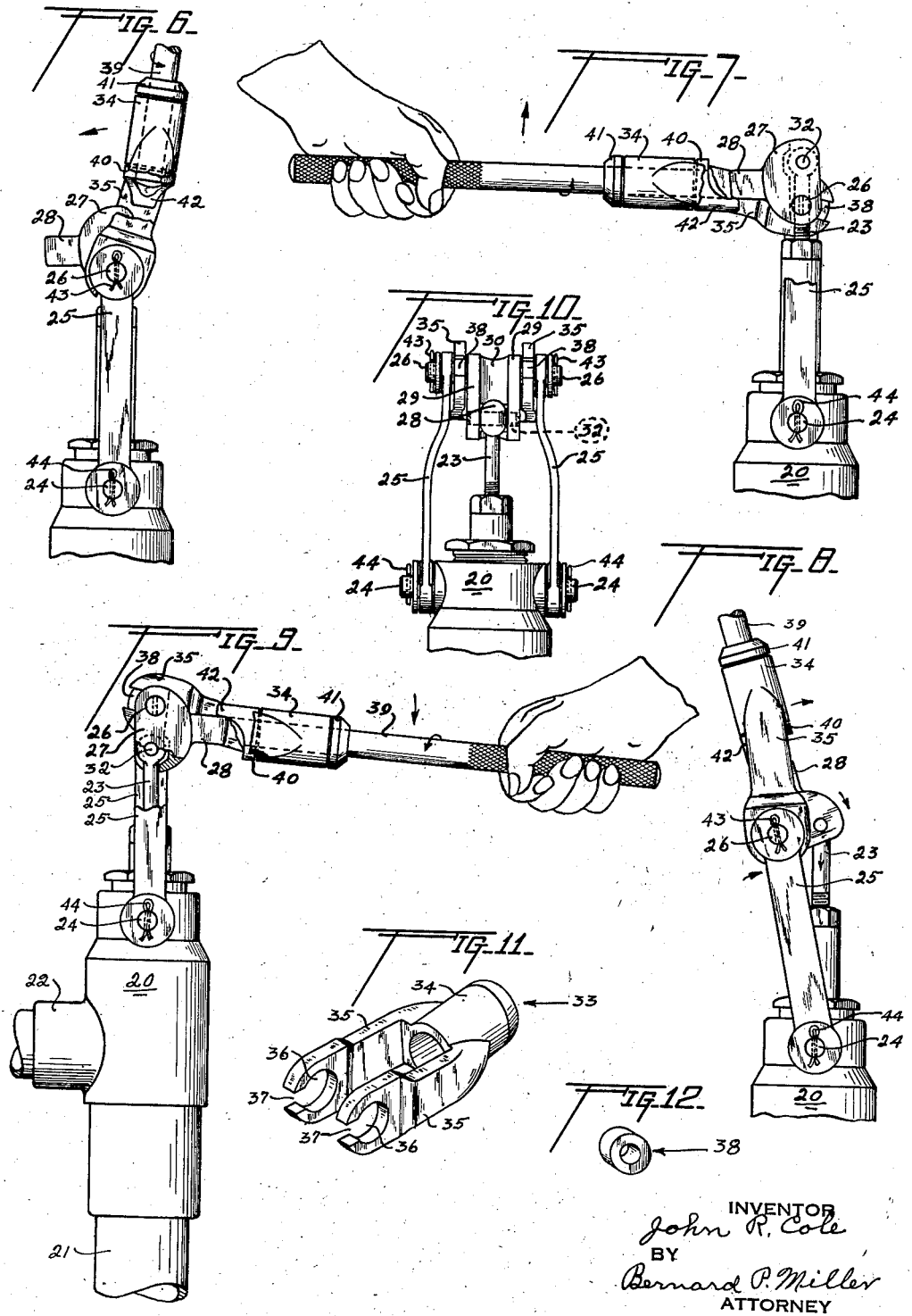

Patented June 3, 1941

2,244,100

UNITED STATES PATENT OFFICE 2,244,100

ACTUATING LEVER MECHANISM FOR RECIPROCATING VALVE STEMS

John R. Cole, Oklahoma City, Okla., assignor to American Iron and Machine Works Company, Oklahoma City, Okla., a corporation of Oklahoma Application April 3, 1939, Serial No. 265,858

2 Claims. (Cl. 137—139)

This invention relates to mechanism for opening and closing valves of the reciprocating stem type.

At the present time, there are many types of valves having vertical stems which carry valve heads on their lower ends for opening and closing flow of fluid through valve housings. In this type of valve, many persons have previously resorted to a cam arrangement operated by a lever arm for moving the valve stem upward to open the valve or downward to a closing position. Such valves are disclosed in U. S. patents numbered 1,973,744 and 2,014,759 issued respectively to L. E. Brown and to O. C. Clay. It frequently occurs in mechanism of this type that when the valve head is slightly opened, fluid pressure in the housing below the head acts to violently and rapidly thrust the valve stem to the upper end of its throw, which movement exerts a blow upon the connected end of the lever arm, and the lever arm is thereby thrown upwardly at a high speed. This action has many times resulted in broken arms and other injuries to the operator or bystanders.

The prime object of the present invention is the provision of a structure for valves of this type which will permit the valve stem to operate in an opening direction under fluid pressure, without travel of the actuating lever or arm therewith.

In the past, efforts have been made to overcome the danger occasioned by the instantaneous movement of the lever arm under force of the fluid pressure, by resorting to various mechanical expediencies within the valve housing, either by balancing the valve head with fluid pressure or providing some sort of a shock absorbing medium within the head. These efforts have so far been somewhat expensive and have failed to entirely eliminate the danger.

In the present structure, the valve stem is permitted to "kick" but in doing so it is not permitted to exert any blow whatever upon the actuating lever which is being held in the hand of an operator.

Other objects of the invention are to provide structure of the type described which will be simple in construction, comparatively cheap to manufacture, durable, simple to operate, and which will be efficient in accomplishing all of the purposes for which it is intended.

In the drawings:

Figure 1 is a side elevational view of a valve made in accordance with the invention, and showing the valve in closed position and the lever arm in position to start its valve opening movement, parts being broken away for the sake of clarity;

Figure 2 is a similar view depicting the initial valve opening movement of the lever arm, downward tension upon the valve stem having been relieved by its movement;

Figure 3 is a similar view showing the position of the apparatus after the valve head has been slightly cracked, and at the point at which the fluid pressure has exerted an upward "kick" upon the valve stem;

Figure 4 is a similar view showing the valve stem in its full open position, and illustrating that the lever arm has not been affected by the entire opening movement of the valve under the fluid force;

Figure 5 is a perspective view of the cam portion or valve actuating element of the mechanism which acts as a means for raising and lowering the stem;

Figure 6 is a view similar to Fig. 4 and showing the valve stem and cam in their open positions, but illustrating the lever arm as it is being swung over the stem toward a position at which the cam may be re-engaged in order to close the valve;

Figure 7 is a similar view showing the lever arm engaged with the cam and in a position to begin the valve closing movement;

Figure 8 is a similar view with the lever arm moving the cam toward its valve closing position;

Figure 9 is a similar view showing the lever arm as it forces the valve stem downwardly to its completely closed position;

Figure 10 is a fragmentary elevational view of the upper portion of the closed valve with the lever arm removed, the view having been taken from a radial position ninety degrees to the right hand of the position at which Figs. 1 and 9 were taken;

Figure 11 is a perspective view of the lever arm head; and,

Figure 12 is a perspective view of a bearing or bushing used in pivotally connecting the lever arm head to the cam member.

Like characters of reference designate like parts in all of the figures.

One practical embodiment of the invention is illustrated in the accompanying two-sheet drawings, wherein:

The reference numeral 20 indicates as a whole a conventional valve housing or body having an inlet opening or end 21 and a side outlet 22. The internal mechanism of the valve is immaterial to the present invention other than the valve head is seated when the valve stem 23 is forced to the lowermost end of its throw, and is open when the stem is at the uppermost end of its permitted travel.

The upper end of the body 20 has oppositely disposed outstanding trunnions 24 which pivotally support the lower ends of the pair of parallel links 25, whose upper ends pivotally engage a pair of oppositely disposed outstanding trunnions 26 and thereby pivotally support a valve actuating element 27 (Fig. 5), having an outstanding arm 28 integral therewith and lying at right angles to the trunnions 26. The element 27 is bifurcated to form two legs 29 which form a channel 30 therebetween, and the legs are provided with aligned perforations 31 which receive a pivot pin 32 for connecting the upper end of the valve stem 23 to the valve actuating element 27.

As a part of the means for moving the valve actuating element 27 to open and close the valve, a lever arm head 33 (Fig. 11), is provided. The head 33 consists substantially of a tubular body 34 having integral longitudinally projecting parallel arms 35 having aligned transverse perforations 36 therethrough. The arms 35 are slotted, as indicated by the reference numerals 37, from their free ends to the adjacent edges of the perforations 36, whereby the arms 35 may be placed between the upper ends of the links 25 and be moved toward the trunnions 26 so that the trunnions may enter the perforations 36 by way of the slots 37. The perforations 36 are larger in diameter than the trunnions 26, and in order to retain the head 33 upon the trunnions, sleeve bearings or bushings 38 (Fig. 12) are slid upon the trunnions and into the perforations 36 after the head is placed upon the trunnions 26. The slots 37 are less in width than the outside diameter of the bearings 38, and therefore, the head 33 cannot be moved longitudinally off the trunnions once the bearings have been installed. The links 25 prevent displacement outwardly of the bearings after they have been keyed to the trunnions, and the outside surfaces of the lever actuating element 27 prevent their movement toward each other.

From the above description it may be seen that the legs 35 of the head 33 straddle the element 27, and that the legs 35 are of sufficient length to permit the arm 28 of the element 27 to freely pass between the trunnions 26 and the adjacent end of the tubular body 34 of the head, as the element 27 is pivotally moved with the trunnions 26 acting as its axis. There is no connection whatever between the elements 27 and 33 per se.

As a means for manually moving the valve actuating element 27, a lever or arm 39 is rotatably journalled in the bore of the tubular body 34 of the head 33. The lever has an enlargement 40 at one end which prevents its withdrawal outwardly from the body 34, and a nut 41 acts to limit movement of the lever toward the element 27. The enlargement 40 has a longitudinally projecting eccentric lip or shoe 42 which is of a sufficient length to contact the arm 28 when the lever is in a proper radial position to register the shoe with the arm.

In assembly, the lever 39 is first inserted through the bore of the tubular body 34 of the head 33 and the nut 41 is installed. This assembly is then mounted upon the valve actuating element 27 by placing the perforations 36 over the trunnions 26 and installing the bearings 38. The upper ends of the links 25 are then placed upon the outer ends of the trunnions 26 and usual cotter keys 43 are installed. The lower ends of the links 25 are then placed over the trunnions 24 on the valve housing and held thereon by usual cotter keys 44. The pin 32 is then inserted in the perforations 31 in order to connect the valve stem 23 and the element 27 together.

*Operation*

When the operative parts of the mechanism are in the positions illustrated in Fig. 1, the valve stem 23 is at the lower end of its throw, and consequently the valve is in a closed position. When in this position, the links 25 are slightly out of alignment with the stem 23 and the trunnions 26 are slightly to the right hand of the axis of the valve stem. This insures a locking of the valve in its closed position since any upward pressure exerted by fluid upon the valve would tend to move the stem upwardly and consequently would have the tendency to move the trunnions 26 farther toward the right hand. Thus, the greater the upward pressure under the valve, the tighter it will be forced closed. When it is desired to move the stem 23 upwardly in order to open the valve, the lever 39 is grasped and rotated to a position bringing the shoe 42 of the enlargement 40 underneath the arm 28 of the valve actuating element 27. Upward movement of the free end of the lever 39 will first bring the element 27 to substantially the position illustrated in Fig. 2, at which position the trunnions 26 will lie slightly to the left hand of the axis of the valve stem 23. When in this position, the upwardly acting force of the fluid will tend to "kick" the trunnions 26 farther toward the left hand. In other words, as soon as the trunnions 26 pass over the axis of the valve stem, the valve stem is free to move upwardly to the end of its throw, and the fluid pressure under the valve head acts as the motive force for fully or partially opening the valve.

Heretofore, valves of somewhat similar construction have been used in which the present arm 28 was extended to provide a hand hold for opening and closing the valve. These valves were extremely dangerous, due to the fact that when the trunnions 26, or their mechanical equivalents, passed over the axis of the valve stem, the "kick" of the upwardly acting fluid pressure would, of course, be exerted upon the outer end of the lever arm which was being held in the hand of the operator, and this "kick" was in many cases so violent that wrists have been broken and other injuries received by the operator or others standing in the path of travel of the lever arm.

As may be clearly seen in Figs. 3 and 4, the "kick" is not transferred to the lever 39 in the present structure. When the "kick" occurs, the arm 28 leaves the shoe 42 and is free to rotate to the fully open position illustrated in full lines in Fig. 4 without the lever 39 having been moved upwardly beyond the position shown in Fig. 2. There will however be a slight longitudinal movement of the lever 39 during opening of the valve due to sidewise movement of the links 25. This movement is illustrated in dotted lines in Fig. 4.

When it is desired to close the valve, the lever 39 and head 33 are swung over the valve stem 23 to the left hand side thereof, the trunnions 26 acting as the axis for this movement. This step is illustrated as occurring in Fig. 6, and during the movement, the lever 39 is rotated upon its own axis within the tubular body 34 so that the shoe 42 will pass the end of the arm 28 as the lever is brought into a substantially horizontal position. The lever 39 is then rotated upon its own axis to bring the shoe 42 beneath the outer end of the arm 28. This position is illustrated in Fig. 7 of the drawings.

In executing the closing operation, the lever 39 is moved upwardly toward the right hand and through the position of Fig. 8 to the closed position of Fig. 9. This latter position is identical with that shown in Fig. 1 except that the shoe 42 is above the arm 28 instead of below it. Before the valve can be again opened, the lever 39 must be rotated upon its own axis to again bring the shoe 42 beneath the arm 28.

From the above description, it will readily be seen that a simple means has been provided for actuating the valve without danger to the operator or others when high fluid pressures are being controlled by the valve, and when the "kick" occurs as the valve is partially opened.

While the invention has been described herein as a means for actuating a valve, it is anticipated to apply the principle of the invention to other mechanical mechanisms wherein a movable element is under a pressure or load tending to move the same, and is being held immovable by an eccentrically mounted pivotal member which is in turn, releasable by a lever arm. For instance, the principle may well be applied to a chain boom such as ordinarily used for fastening logs or the like to trucks or railway cars. For this reason, it is not intended to limit the field of the invention, nor the uses to which it may be put, only to the application thereof as is described herein, and I therefore reserve all rights in and to the principle of the invention except as I am limited by the appended claims.

I claim:

1. The combination of: a valve housing; a valve stem reciprocatably mounted in the housing and having one end projecting therefrom; a pair of parallel links pivoted to the housing; a stem actuating element pivotally mounted between the free ends of said links, and having a pivotal connection with the stem off-set from the connection with the links; a projection carried by said element; a lever arm pivotally carried by the links upon the same pivotal axis with the stem actuating element; and, means carried by the arm for selectively engaging and disengaging said projection.

2. The combination of: a valve housing; a valve stem reciprocatably mounted in the housing and having one end projecting therefrom; a pair of parallel links pivoted to the housing; a stem actuating element pivotally mounted between the free ends of said links, and having a pivotal connection with the stem off-set from the connection with the links; a projection carried by said element; a lever arm head pivotally carried by the links upon the same pivotal axis with the stem actuating element; a lever arm mounted in the head and rotatable upon its own longitudinal axis; and a shoe carried by the arm and movable into and out of the path of said projection by rotation of the arm.

JOHN R. COLE.